(No Model.)
C. H. CHARLTON, Jr. & J. F. CHARLTON.
NUT LOCK.
No. 605,078. Patented June 7, 1898.
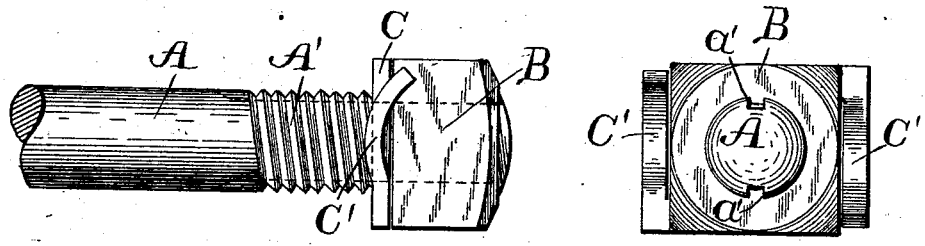
Fig. 1. Fig. 2.
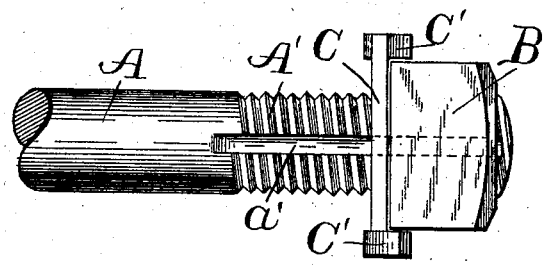
Fig. 3.
Fig. 4. Fig. 5.
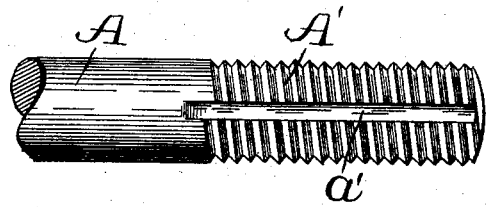 
Fig. 6.
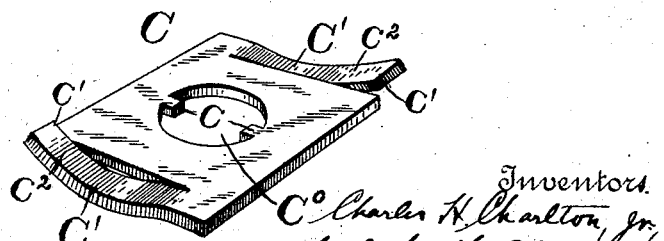
Witnesses
D. H. Blakelock.
John C. Wilson.
Inventors
Charles H. Charlton, Jr.
and John F. Charlton,
by Whitman & Wilkinson, Attorneys

UNITED STATES PATENT OFFICE.

CHARLES H. CHARLTON, JR., AND JOHN F. CHARLTON, OF NEW ORLEANS, LOUISIANA.

NUT-LOCK.

SPECIFICATION forming part of Letters Patent No. 605,078, dated June 7, 1898.

Application filed August 17, 1897. Serial No. 648,568. (No model.)

*To all whom it may concern:*

Be it known that we, CHARLES H. CHARLTON, Jr., and JOHN F. CHARLTON, citizens of the United States, residing at New Orleans, in the parish of Orleans and State of Louisiana, have invented certain new and useful Improvements in Nut-Locks; and we do hereby declare the following to be a full, clear, and exact description of the invention, such as will enable others skilled in the art to which it appertains to make and use the same.

Our invention relates to improvements in nut-locks; and it consists in the novel devices hereinafter described and claimed.

Our invention will be understood by reference to the accompanying drawings, wherein the same parts are indicated by the same letters throughout the several views.

Figure 1 represents a side view of a bolt having the nut and nut-lock applied thereto. Fig. 2 is an end view of the same as seen from the right in Fig. 1. Fig. 3 is a view of the bolt and nut with the nut-lock as seen from the top of the sheet in Fig. 1. Fig. 4 is a side view of the screw-threaded end of the bolt, showing one of the grooves therein. Fig. 5 is an end view of the same as seen from the right in Fig. 4, and Fig. 6 is a perspective view of the locking-plate.

The bolt A is provided with the usual screw-threaded portion A', in which, however, there is formed one or more longitudinal grooves $a'$, as shown in Figs. 2, 3, 4, and 5.

The nut may be of any ordinary construction or shape, provided with internal screw-threads adapted to engage the screw-threaded end of the bolt, as shown in Figs. 1, 2, and 3.

The locking-plate or lock consists of a metallic plate C, having a central opening $C^0$, adapted to fit over the screw-threaded end of the bolt and provided with one or more lugs $c$, which project into said central opening and are adapted to take into the groove or grooves $a'$ on the screw-threaded portion of the bolt, so that the said plate may be placed over the end of the bolt by fitting the lug or lugs into the groove or grooves on the screw-threaded portion of the bolt. It will thus be seen that when the said plate has been so fitted upon the end of the bolt it will be held against turning by the said lugs thereon.

Upon one or more edges of the plate C there is formed a curved spring-arm C'. (Shown most clearly in Fig. 6.) This spring-arm is so arranged that when the plate C is in position upon the bolt and the nut B has been screwed down thereon the said nut may turn forward, the corners thereof passing up the inclined surface $c^2$ of the said spring-arm and the said spring-arm returning to its normal position after the said corner has passed thereover, so that the corner of the nut will strike against the inner side of the end $c'$ of the said spring-arm should it be attempted to turn the nut backward.

The locking-plate C will be firmly held in position in whichever direction the nut may be turned by the lugs $c$ thereon taking into the grooves $a'$ on the bolt, as hereinbefore described.

To remove the nut from the bolt, the spring arm or arms C' must be bent downward sufficiently to allow the corners of the nut to pass over the end $c'$ thereof.

It will thus be seen that we provide a very cheap and simple device for locking a nut against turning backward upon its bolt, and the many advantages thereof will be apparent to any practical mind.

Having thus described our invention, what we claim, and desire to secure by Letters Patent of the United States, is—

1. In a nut-lock, the combination with a bolt having a longitudinal groove along its screw-threaded portion; of a metallic plate provided with an opening adapted to fit over said screw-threaded portion of the bolt, and having a lug extending into said opening, adapted to take in said groove on the bolt; and a spring-arm at one side of said plate bent first toward the back of the plate and then toward the front and having its free end extending outward from the face of the said plate, substantially as described.

2. In a nut-lock the combination with a bolt having a plurality of longitudinal grooves along its screw-threaded portion; of a metallic plate provided with an opening adapted to fit over said screw-threaded portion of the bolt, and having a plurality of lugs extending into said opening adapted to take in said grooves in the bolt; and a plurality of spring-arms upon side edges of said plate bent first toward the back of the plate and then toward the front and having their free ends extending outward from the face of the said plate, substantially as described.

3. A combined nut-lock and washer comprising the flat metallic plate C, having central opening C⁰, and lugs c protruding into said opening; and spring-arms C' bent first toward the back of the plate and then toward the front and having their free ends c' extending outward from the face of the said plate, substantially as described.

4. A combined nut-lock and washer comprising a flat metallic plate having a central opening therethrough for the passage of the bolt; a plurality of lugs thereon protruding into said central opening; and a plurality of spring-arms upon side edges of said plate bent first toward the back of the plate and then toward the front and having their free ends turned outward from the face thereof, substantially as described.

In testimony whereof we affix our signatures in presence of two witnesses.

CHAS. H. CHARLTON, Jr.
JOHN F. CHARLTON.

Witnesses:
JAMES W. MORRISSEY,
JOHN J. SAUCIER.